July 8, 1924.  1,500,356

A. G. ZEUMER

MACHINE FOR REMOVING BRISTLES FROM SKINS OR HIDES

Filed Dec. 5, 1923

Witnesses:

Inventor:
Arthur Gustav Zeumer

Patented July 8, 1924.

1,500,356

UNITED STATES PATENT OFFICE.

ARTHUR GUSTAV ZEUMER, OF MARKRANSTADT, GERMANY.

MACHINE FOR REMOVING BRISTLES FROM SKINS OR HIDES.

Application filed December 5, 1923. Serial No. 678,700.

*To all whom it may concern:*

Be it known that I, ARTHUR GUSTAV ZEUMER, a citizen of the German Republic, and residing at Markranstadt, Germany, have invented certain new and useful Improvements in a Machine for Removing Bristles from Skins or Hides, of which the following is a specification.

This invention relates to improvements in a machine for removing bristles from skins or hides, of the type in which the skin or hide is guided around a horizontally located stretching-board with pointed outer edge and is at the latter parted by rotary brushes, so that the bristles project from the soft hairs of the skin or hide and can be cut off.

According to the invention, directly in front of the pointed outer edge of the stretching-board a long narrow suction nozzle is mounted for straightening the projected and mostly crooked bristles, so that all bristles can be cut off at the root.

Figure 1:
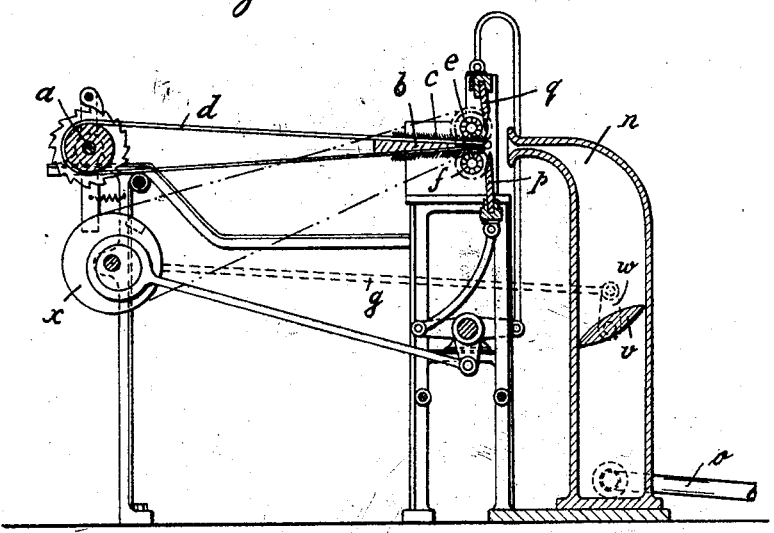
Figure 2:
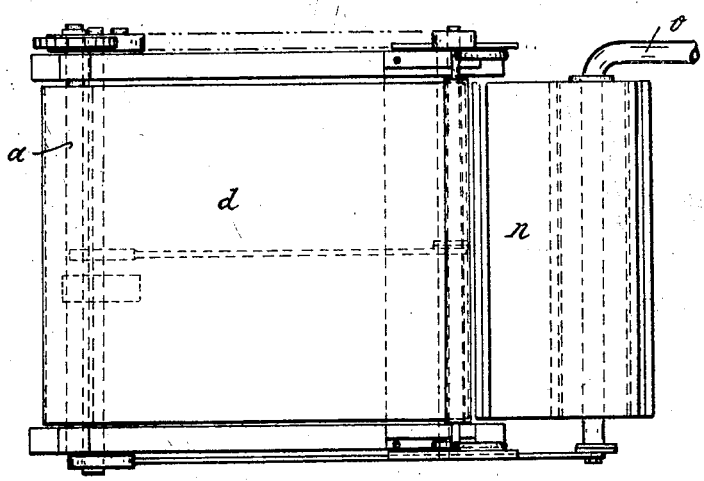

The accompanying drawing represents a machine embodying the improvement: Fig. 1 is a sectional side view, and Fig. 2 is a plan view, of the same.

Around the rotary shaft $a$ and the stretching-board $b$ a stepwise moved endless ribbon $d$ is led, which serves to fix thereon the skin or hide $c$ to be treated, the rotary brushes $e, f$ above and below said stretching-board serving to part the skin or hide.

Directly in front of the pointed outer edge of the stretching-board, where the skin or hide is parted by the brushes, a long narrow suction nozzle $n$ is mounted, which is connected with a suction blower through a pipe $o$.

The bristles straightened or erected by the suction air are wholly cut off by the cutters $p, q$. This being finished and the cutters being retracted, a throttle-flap $v$ controlling the bore of the nozzle $n$ is closed by means of a crank $w$ and a rod $g$ which are actuated from a cam-disc $x$ of the machine gearing. During the closing position of the flap $v$ the skin or hide is advanced for a further step and again parted by the brushes $e, f$, whereupon the flap $v$ is re-opened and the bristles are cut off, and so on.

What I claim, is:—

In a machine for removing bristles from skins or hides, the combination with a rotary shaft, a horizontally located stretching-board having a pointed outer edge, a stepwise moved endless ribbon led around said shaft and board and adapted to receive the skin or hide to be treated thereon, and a pair of brushes, one above and the other below the pointed outer edge of said stretching-board; of a long narrow suction nozzle directly in front of the pointed outer edge of said stretching-board, and means to control the bore of said nozzle in dependence upon the advance of said endless ribbon; substantially as and for the purpose set forth.

In testimony whereof I have hereunto set my hand in the presence of two subscribing witnesses.

ARTHUR GUSTAV ZEUMER.

Witnesses:
 RICHARD ZEUMER,
 RUD. E. FRICKE.